(12) United States Patent
Dalmia

(10) Patent No.: US 9,713,739 B2
(45) Date of Patent: Jul. 25, 2017

(54) PORTABLE ELLIPTICAL EXERCISE MACHINE

(71) Applicant: FITNESS CUBED INC., Chicago, IL (US)

(72) Inventor: Arnav Dalmia, Chicago, IL (US)

(73) Assignee: FITNESS CUBED INC., Chicago, IL (US)

( * ) Notice: Subject to any disclaimer, the term of this patent is extended or adjusted under 35 U.S.C. 154(b) by 0 days.

(21) Appl. No.: 15/108,077

(22) PCT Filed: Nov. 6, 2015

(86) PCT No.: PCT/US2015/059476
§ 371 (c)(1),
(2) Date: Jun. 24, 2016

(87) PCT Pub. No.: WO2016/073857
PCT Pub. Date: May 12, 2016

(65) Prior Publication Data
US 2016/0317859 A1 Nov. 3, 2016

Related U.S. Application Data

(60) Provisional application No. 62/077,170, filed on Nov. 7, 2014.

(51) Int. Cl.
*A63B 22/00* (2006.01)
*A63B 22/04* (2006.01)
(Continued)

(52) U.S. Cl.
CPC .......... *A63B 22/04* (2013.01); *A63B 21/0051* (2013.01); *A63B 21/00069* (2013.01);
(Continued)

(58) Field of Classification Search
USPC .................................................... 482/1–148
See application file for complete search history.

(56) References Cited

U.S. PATENT DOCUMENTS 3,316,898 A 5/1967 Brown
3,831,942 A * 8/1974 Del Mar ............ A63B 21/0051
310/105

(Continued)

OTHER PUBLICATIONS

International Search Report and Written Opinion of the International Searching Authority dated Feb. 4, 2016 from corresponding Application No. PCT/US2015/059476.

*Primary Examiner* — Stephen Crow
(74) *Attorney, Agent, or Firm* — Katten Muchin Rosenman LLP

(57) ABSTRACT

An exercise apparatus having a pulley, a pair of stabilizing assemblies each configured to couple a front portion of a respective pedal element to each side of the pulley, a looped belt configured to couple the pulley to a resistance assembly, a tension stabilizer configured to maintain a tension of the looped belt on the pulley, and the resistance assembly configured to assert an adjustable resistance to the pedal elements through the looped belt, where the resistance is adjusted by changing a distance between a flywheel element and a corresponding magnetic plate element of the resistance assembly, the magnetic plate asserting a magnetic force over the distance on the flywheel element and the looped belt looping around a co-rotating extension from the flywheel element.

6 Claims, 7 Drawing Sheets

(51) Int. Cl.
*A63B 21/005* (2006.01)
*A63B 21/22* (2006.01)
*A63B 22/06* (2006.01)
*A63B 71/06* (2006.01)
*A63B 21/00* (2006.01)
*H04M 1/725* (2006.01)

(52) U.S. Cl.
CPC ........ *A63B 21/225* (2013.01); *A63B 22/0046* (2013.01); *A63B 22/06* (2013.01); *A63B 22/0664* (2013.01); *A63B 22/0694* (2013.01); *A63B 21/0054* (2015.10); *A63B 21/00196* (2013.01); *A63B 2022/0688* (2013.01); *A63B 2071/0683* (2013.01); *A63B 2220/805* (2013.01); *A63B 2220/806* (2013.01); *A63B 2225/20* (2013.01); *A63B 2225/50* (2013.01); *A63B 2225/64* (2013.01); *H04M 1/7253* (2013.01)

(56) References Cited

U.S. PATENT DOCUMENTS

| | | | |
|---|---|---|---|
| 3,917,261 A | 11/1975 | Small et al. | |
| 5,199,931 A | 4/1993 | Easley et al. | |
| 5,580,337 A | 12/1996 | Habing et al. | |
| 5,685,804 A | 11/1997 | Whan-Tong et al. | |
| 5,860,941 A | 1/1999 | Saringer et al. | |
| 5,904,638 A | 5/1999 | Habing et al. | |
| 5,947,868 A | 9/1999 | Dugan | |
| 6,572,514 B1 | 6/2003 | Calafato | |
| 6,921,351 B1 | 7/2005 | Hickman et al. | |
| 7,153,238 B2* | 12/2006 | Anderson | A63B 22/205 482/51 |
| 7,385,324 B2 | 6/2008 | Lin | |
| 7,402,915 B2* | 7/2008 | Hutchinson | H02K 7/1853 290/1 A |
| 7,485,073 B2 | 2/2009 | Chang | |
| 7,497,807 B2 | 3/2009 | Neff et al. | |
| 7,497,808 B2* | 3/2009 | Eschenbach | A63B 22/001 482/51 |
| 7,497,812 B2 | 3/2009 | Neff et al. | |
| 7,695,410 B2 | 4/2010 | Kim et al. | |
| 7,901,331 B1 | 3/2011 | Stoll | |
| 8,485,945 B2 | 7/2013 | Leonhard | |
| 2003/0036462 A1 | 2/2003 | Ravikumar et al. | |
| 2004/0009848 A1 | 1/2004 | Lee | |
| 2005/0009668 A1* | 1/2005 | Savettiere | A63B 22/0023 482/66 |
| 2005/0014609 A1 | 1/2005 | Neff | |
| 2007/0179411 A1 | 8/2007 | Galvez Campos | |
| 2007/0219059 A1 | 9/2007 | Schwartz et al. | |
| 2011/0143884 A1 | 6/2011 | Chu | |
| 2013/0190139 A1 | 7/2013 | Piaget et al. | |
| 2013/0310225 A1 | 11/2013 | Johnson | |
| 2014/0274622 A1 | 9/2014 | Leonhard | |
| 2015/0141200 A1* | 5/2015 | Murray | A63B 21/154 482/5 |

\* cited by examiner

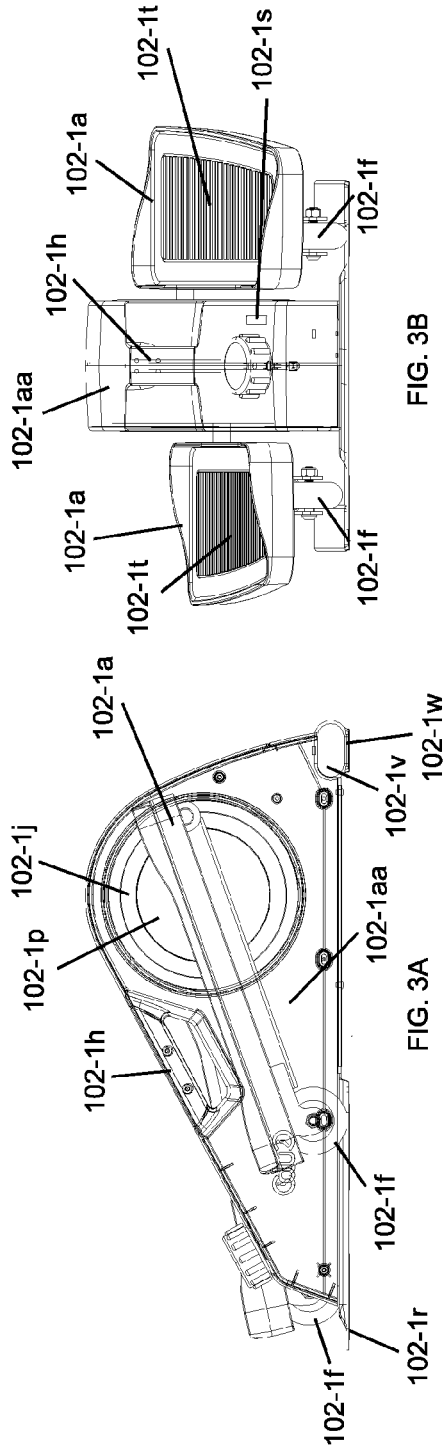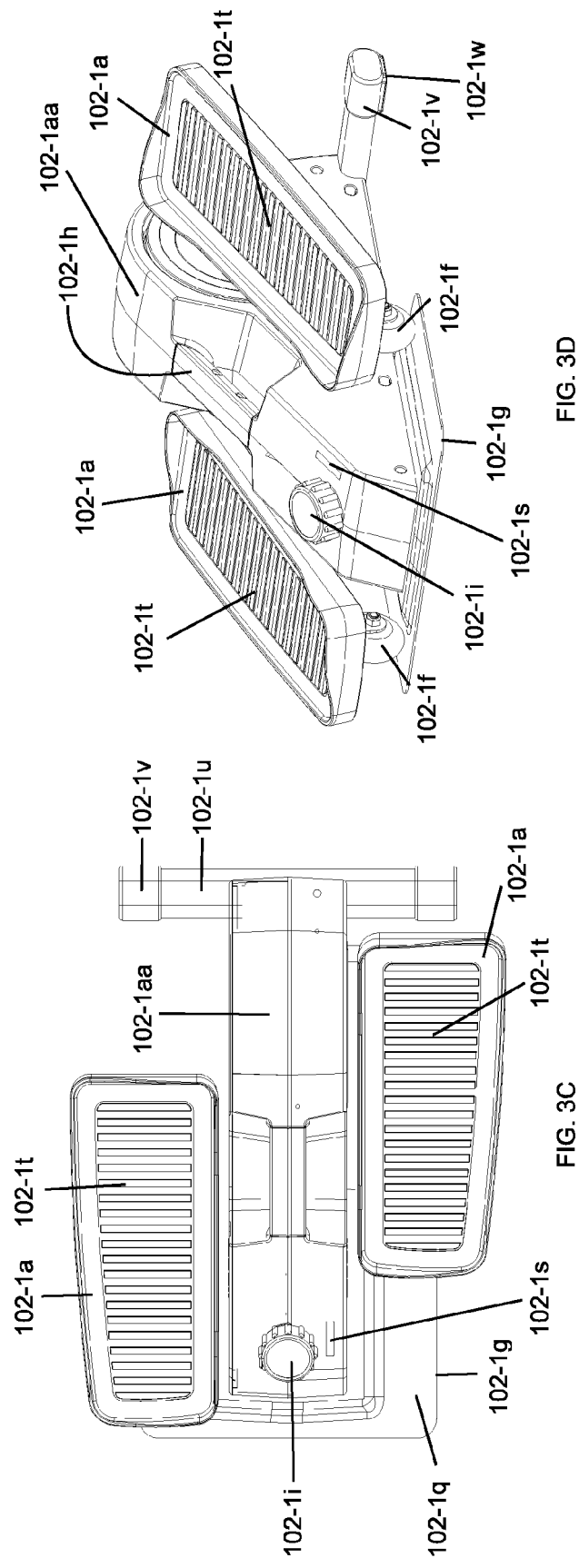

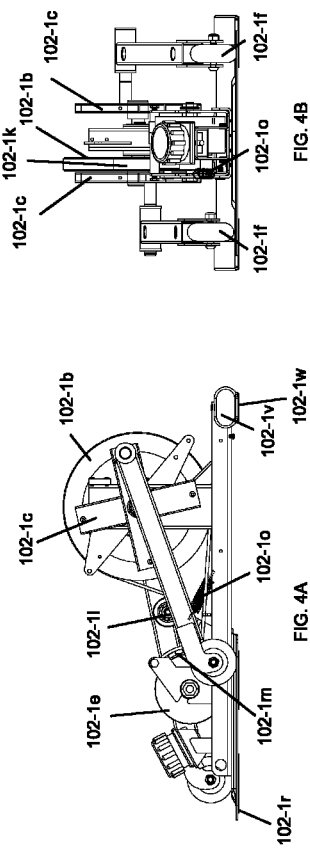
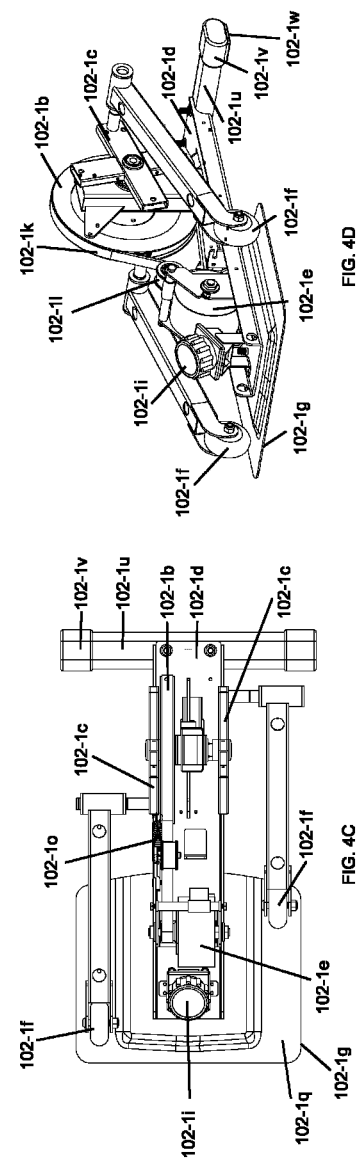

PORTABLE ELLIPTICAL EXERCISE MACHINE

CROSS REFERENCE TO RELATED APPLICATIONS

This application claims priority under 35 U.S.C. 120 from U.S. provisional patent application No. 62/077,170 filed on Nov. 7, 2014, which is hereby incorporated by reference.

FIELD

The present invention relates to an exercise system. More specifically, the present invention is directed to a portable, low-profile exercise machine that provides a genuine elliptical exercise within the confined space of a seated work space.

BACKGROUND

Exercise equipment has a long history of development. There have been many proposed machines for simulating physical activities—such as running, cycling, and skiing—or otherwise providing a means for exercising on a stationary apparatus, both for fitness and rehabilitation purposes. Correspondingly, there have been proposed systems for integrating computer technology to these machines for improved exercise programming and performance tracking.

U.S. Pat. No. 3,316,898 describes an exercise machine for legs and hips.

U.S. Pat. No. 3,917,261 describes a foot exercise machine for bedridden patients.

U.S. Pat. Nos. 5,580,337 and 5,904,638 describe a recumbent cycling machine.

U.S. Pat. No. 5,685,804 describes a standing exercise machine that simulates walking jogging, and cross-country skiing.

U.S. Pat. No. 5,860,941 describes an active and continuous passive motion (CPM) device for cycling upper and lower extremities for rehabilitation purposes.

U.S. Pat. No. 5,947,868 describe a recumbent cycling machine with an interface to a computer and/or video game player.

U.S. Pat. No. 6,572,514 describe a spring-loaded foot pedaling machine.

U.S. Pat. No. 6,921,351 describes a stationary cycling machine with an onboard computer and an interface for communicating with external computers and networks.

U.S. Pat. No. 7,485,073 describes a sliding foot/hand exerciser.

U.S. Patent Application Publication No. 2007/0219059 describes a technique for tracking exercises through the use of a mobile monitoring device.

Recent research has suggested that moderate exercise throughout the day can provide additional benefits over merely exercising at the gym for 30 to 60 minutes daily. And in order to address the health concerns presented by the modern sedentary lifestyle, there have been proposed apparatuses for improving the ease and effectiveness of increased exercise throughout a busy work day. In particular, there have been proposed workstations that incorporate elements of an exercise machine and machines dedicated to providing an opportunity for exercise while seated at a work desk.

U.S. Pat. Nos. 7,497,807 and 7,497,812 describe a stationary cycling assembly for attachment to an underside of a desk and a computer for displaying a virtual exercise environment on the desk.

U.S. Pat. No. 7,695,410 describes a cycling apparatus that is mountable to a work chair at a desk.

U.S. Pat. No. 7,901,331 describes an elliptical exercise machine that is usable while seated on a chair.

U.S. Pat. No. 8,485,945 describes an exercise workstation that includes a table assembly having a working surface, and an elliptical trainer.

U.S. Patent Application Publication No. 2007/0179411 describes a portable sliding, stepping, and pedaling machine for seated exercise.

U.S. Patent Application Publication No. 2003/0036462 describes an active/passive foot pedaling machine that is usable while seated on a chair.

U.S. Patent Application Publication No. 2004/0009848 describes a portable cycling device that is usable while seated at a desk.

U.S. Patent Application Publication No. 2005/0014609 describes a stationary cycling assembly for attachment to an underside of a desk.

U.S. Patent Application Publication No. 2014/0274622 describes a connector for coupling an exercise device to a five-leg chair.

SUMMARY

In view of the above, it is an object of the invention to provide an improved exercise apparatus that is portable and conveniently usable while being seated at a desk. It is an additional object of the invention to provide a portable machine that is non-intrusive to a workspace and that, nevertheless, enables a smooth and genuinely elliptical motion, with optimal foot angles to prevent any distraction from regular work. With this in mind, the present invention is directed to an exercise apparatus that comprises a pulley; a pair of stabilizing assemblies each configured to couple a respective front portion of a pedal element to each side of said pulley; a looped belt configured to couple the pulley to a resistance assembly; a tension stabilizer configured to maintain a tension of the looped belt on the pulley; and the resistance assembly configured to assert an adjustable resistance to the pedal elements by adjusting a magnetic force on the looped belt, wherein the magnetic force is adjusted by changing a distance between the flywheel and magnetic plate of the resistance assembly.

In accordance with an embodiment of the present invention, an exercise system incorporates an exercise device, mobile device, central system and a user engagement platform for monitoring user exercise activity.

In accordance with an embodiment of the present invention, an exercise system comprises an exercise device including a wireless transceiver configured to wirelessly communicate data associated with exercise activity to a mobile device.

In accordance with an embodiment of the present invention, the exercise system comprises a central system configured to receive exercise activity from the mobile device.

An exercise system including an exercise device having memory and a processor and computer program steps stored in the memory and configured to be executed by the processor, the computer program steps comprising: sensing rotations of a mechanical component of exercise device; transmitting data associated with the rotations of the mechanical component; and calculating data associated with exercise activity of the user.

BRIEF DESCRIPTION OF DRAWINGS

FIGS. 3A-D depict perspective views of the exercise device shown in FIG. 1.

FIGS. 4A-D depict perspective views of the exercise device shown in FIG. 1 with the housing removed to illustrate the internal arrangement of its mechanical components.

DESCRIPTION OF EMBODIMENTS

Figure 1:
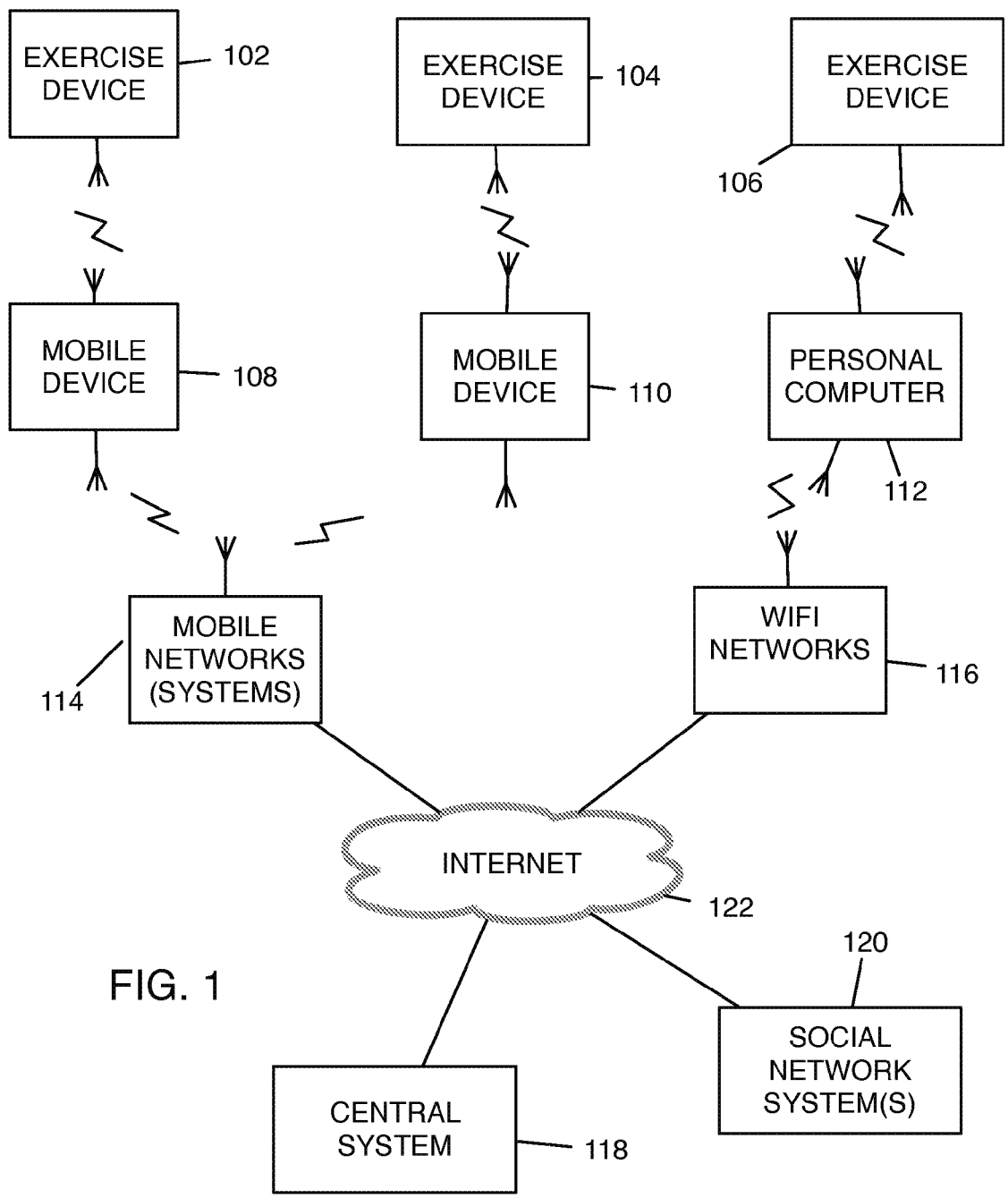
FIG. 1 depicts a block diagram of an example exercise system.

FIG. 1 depicts a block of an example exercise system 100 that includes several exercise devices 102, 104, 106, mobile devices 108, 110 and personal computer 112, wireless networks such as mobile networks 114 and WIFI networks 116, central system 118 and content providers such as social networks 120. Exercise system 100 incorporates a platform for monitoring user exercise activity.

Mobile devices 102, 104 and personal computer 112 are connected to central system 118 and social networks 120 (any content provider) via a communication network such as Internet 122 as known to those skilled in the art. Users may use mobile devices 102, 104 or personal computer 112 to access applications and information locally within the devices and personal computer, respectively or remotely from central system 118 (or any content provider) via a web browser or stand alone application on mobile devices 108, 110 or personal computer 112 as known to those skilled in the art (as described in more detail below).

Each exercise device 102, 104, 106 is used by a user to address the problem of sedentary behavior in the workplace. As disclosed in more detail below, each exercise devices 102, 104, 106 is an elliptical trainer that is configured for use under a desk. Specifically, the elliptical trainer is positioned on the floor under a user's desk. The user will pedal the footpads while working at his/her desk. Details of this elliptical trainer are described below. While an elliptical trainer is disclosed, those skilled in the art know that other exercise devices may be used to achieve the same results. Exercise devices 102, 104 may communicate with mobile devices 102, 104 wirelessly or by wired connection. In a wireless configuration, an exercise device may connect to mobile device by way of Bluetooth or other wireless communication protocols known to those skilled in the art. In a wired configuration, a mobile device may connect by wire to respective ports on the devices. This is described in more detail below.

Examples of mobile devices 108, 110 as described herein include smartphones (e.g., iPhones, Android phones), cell phones, tablets (e.g. iPads), laptop, PDAs and other devices. Personal computer is a desktop computer as known to those skilled in the art. Mobile devices 108, 110 will enable a user to communicate wirelessly with and access content from central system 118 or other systems if desired, over Internet 120 through mobile networks 114 (e.g., Verizon, Sprint, T-Mobile and AT&T) or available WIFI networks 116).

Personal computer 112 also enables a user to communicate with central system 118 (or other system) over Internet 120 via cable, ISDN, WIFI or wireless carrier. (Two mobile devices and one personal computer are shown for illustrative purposes, but those skilled in the art know that any number of mobile devices or personal computers may be used for any number of clients and counselors (users). Central system 118 is configured to facilitate the provision of targeted content from content providers such as social networking systems 120 to users via mobile devices 108, 110 and/or personal computer 112. In accordance with an embodiment of the invention, exercise devices 102-106 may directly communicate with a network—for example, WIFI networks 116.

As described in more detail below, central system 118 includes one or more servers including a web server. Each server includes several internal components, databases, software modules and applications as known to those skilled in the art. This is described in more detail below. System 10 is used to implement the application processes discussed herein.

Figure 2:
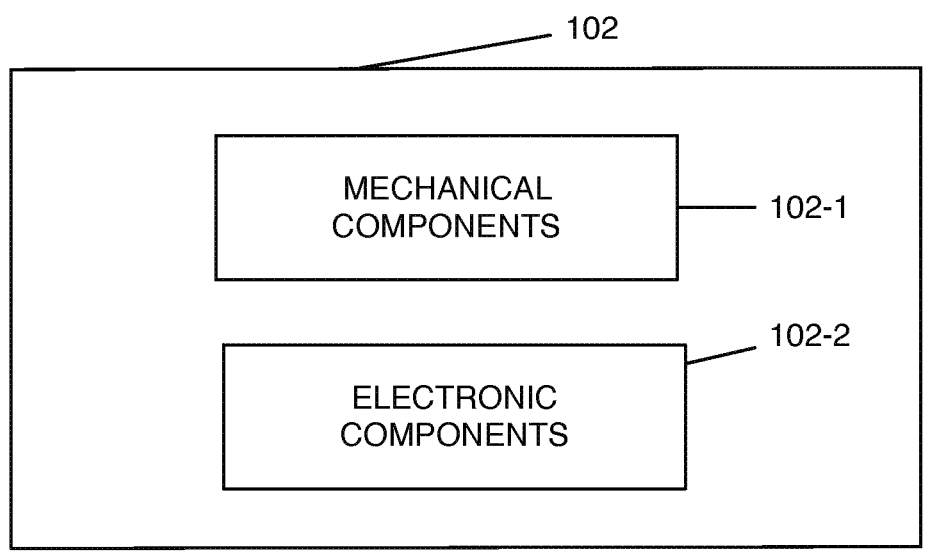
FIG. 2 depicts a block diagram of the exercise device shown in FIG. 1.

Reference is now made to FIGS. 2-4. FIG. 2 depicts a high-level block diagram of the exercise device 102 (example) shown in FIG. 1. In particular, exercise device 102 comprises mechanical components 102-1 that perform the basic operation of exercise functions and electronic components 102-2 that performs several functions including monitoring mechanical movement of certain mechanical components 102-1, converts mechanical movement into an electronic signal/data and transmits this data to a mobile device. Electronic components 102-2 also function to convert the mechanical movement into energy that is stored and subsequently used to charge the battery of a mobile device.

FIGS. 3A-D depict perspective views of the exercise device shown in FIG. 1. In particular, exercise device 102 (example) is an elliptical trainer and its mechanical components 102-1 include pedals/footpads 102-1*a* that each engage a user's foot. As shown in FIGS. 3A-D, the pedals 102-1*a* are each coupled to a circular rotation assembly—which will be described in further detail below with FIGS. 4A-D—on a front (or toe) end. And the pedals 102-1*a* each incorporate wheels 102-1*f* positioned on the opposite back (or heel) end for a sliding motion on a base plate 102-1*g*. In accordance with an exemplary embodiment of the invention, the base plate 102-1*g* may be made with a metallic or composite material coupled to a metallic (or composite) frame (main chassis) 102-1*d* of the exercise device and may comprise a silicone pad 102-1*q* on a top side for friction and noise reduction on the contact with the wheels 102-1*f* as they travel back and forth. The base plate 102-1*g* may also incorporate a polymer material 102-1*r*, such as Ethylene-vinyl acetate (EVA), on its underside to increase traction between the base plate and the floor—thus preventing the exercise device from slipping during use. With the combination of the circular motion on front (toe) end and a sliding motion on the back (heel) end, the pedals 102-1*a* provide an effective elliptical motion for a user's feet and legs, thus enabling a cardiovascular exercise that reduces stress on the user's joints. In addition, the pedals 102-1*a*—and thus, the elliptical motion—are angled to allow use in a seated position. And comfort mats, which may be composed of silicone material and the like, 102-1*t* may be placed on pedals 102-1*a*. The elliptical motion also reduces the vertical profile of the user's leg movement, thus allowing the exercise device to be used under a desk while preventing the user's knees from being obstructed by the underside of the desk through the elliptical motion. According to an exemplary embodiment of the invention, the exercise device may also incorporate a handle 102-1h that is centrally positioned on its top side such that a user may conveniently carry, move, place, and adjust the exercise device. Thus, the exercise device according to the present invention is a portable, low profile apparatus that allows an angled elliptical exercise for a user in a seated position—for example, while seated at a work desk and the like. In accordance with an exemplary embodiment of the invention, the housing 102-1aa of the exercise device may include a display screen 102-1s configured to display a user-interface for interacting with a software program in connection with the operation of the exercise device, such as activity tracking, exercise programming, etc. For balanced support and stability of the exercise device, the main chassis 102-1d may incorporate a chassis front bar 102-1u with end caps 102-1v, which may be composed of composite material and the like, on opposing ends thereof. Similar to the base plate 102-1g, the end caps 102-1v may each comprise a polymer material 102-1w, such as Ethylene-vinyl acetate (EVA), on its underside to increase traction with the floor—thus preventing the exercise device from slipping during use.

FIGS. 4A-D are perspective views of the exercise device corresponding to FIGS. 3A-D with the housing 102-1aa removed to illustrate the internal arrangement of the mechanical components 102-1. As shown in FIGS. 4A-D, a pulley 102-1b and rotary stabilizers 102-1c form the internal circular rotation assembly coupled to the front (toe) ends of pedals 102-1a for providing a circular motion, as described above with reference to FIGS. 3A-D. According to an exemplary embodiment of the invention, pulley 102-1b and stabilizers 102-c are coupled to an anchoring pillar component of base frame (or main chassis) 102-1d of the exercise device on a common rotary axis. Stabilizers 102-1c provide support for disc rings 102-1j and cover discs 102-1p, shown in FIGS. 3A and 3D, for covering the circular rotation assembly within the housing of the exercise device. Stabilizers 102-1c also provide additional mass to the circular rotation assembly so that sufficient inertia is generated—with the rotation of the pulley 102-1b and stabilizers 102-1c—to ensure stability of the exercise device during use. In particular, the added inertia of stabilizers 102-1c allows the use of a smaller flywheel 102-1e while maintaining stability in the overall system—and, thus, reducing the vertical profile of the exercise device at the front end of the device where the user's legs are placed—to fit the exercise device under a desk. The stabilizers 102-1c further provide weight balance for the exercise device such that the handle 102-1h gives the user a grasp on the center of balance of the exercise device while carrying/moving the device. As described above, foot pedals 102-1a are configured to an angle to optimize the user's foot motion for seated exercise. And as shown in FIGS. 4A-D, pedals 102-1a may be supported by a shaft that connects stabilizers 102-1c and wheels 102-1f in such an angle. The exercise device, thus, provides for ideal foot angles for seated exercise through an elliptical motion—the foot pedal angles ranging between approximately 2° and 32° from horizontal.

In accordance with an exemplary embodiment of the invention, the pulley 102-1b may have a diameter of approximately 196 mm (thus also defining a rotational diameter), thickness of approximately 20 mm, and mass of approximately 314 g. And as shown in FIGS. 4A-D, the stabilizers 102-1c may be embodied by a cross-shaped structure (or cross-bar) that measures approximately 150 mm in length/rotational diameter and 670 g in mass.

The Exercise device further comprises resistive components, which may embody a magnetic flywheel 102-1e, that provide resistance to the pulley 102-1b. According to an exemplary embodiment of the invention, the resistive components may include a magnetic system that controls a resistance of the pulley 102-1b—and thus, the pedals 102-1a—by controlling a distance between a magnetic plate 102-1m and the flywheel element 102-1e. The flywheel element 102-1e may have a magnetic property so that a decreased distance from the magnetic plate 102-1m would increase resistance (by a magnetic force asserted by the magnetic plate 102-1m over the adjustable distance on the flywheel 102-1e) and, thus, the inertia needed to rotate the flywheel 102-1e. And the looped belt 102-1k loops around a co-rotating extension 102-1n from the flywheel 102-1e such that the resistance on the flywheel 102-1e is translated to the looped belt 102-1k, which is, in turn, translated to pulley 102-1b on the other end of looped belt 102-1k. The distance between the flywheel 102-1e and its corresponding magnetic plate 102-1m may be set and altered between approximately 3 mm (maximum resistance) and approximately 17 mm (minimum resistance). A tension adjuster/control dial 102-1i may be provided for the user to adjust this distance and, hence, to control the resistive components 102-1e and 102-1m in order to alter the resistance of the exercise device. In addition, a tension component (e.g., roller 102-1l) may also be provided to maintain tension of the belt 102-1k around the pulley 102-1b and the extension 102-1n from flywheel 102-1e, especially during changes in resistance, to maintain smooth motion of the exercise device. As shown in FIGS. 4A-D, the tension component 102-1l may be embodied by a roller coupled to the base frame 102-1d of the exercise device via a spring element 102-1o to assert a tension on magnetic belt 102-1k.

In accordance with an exemplary embodiment of the invention, the flywheel element of the resistive components 102-1e may have a diameter of approximately 95 mm, thickness of approximately 50 mm, and mass of approximately 2.5 kg. The tension spring component 102-1o coupled to the roller 102-1l may have an adjustable length between approximately 65 and 76 mm. And the roller 102-1l may have a diameter of approximately 34 mm, thickness of approximately 25 mm, and mass of approximately 50 g.

The mechanical components 102-1 may optionally include vibration mechanical components within the pedals/footpads 102-1 a. These footpads may also include electronic components for the vibration components and heating as well as described below.

In accordance with an alternative embodiment of the invention, control dial 102-1i may be replaced by or augmented with on-board electronic display and/or controls (not shown) and/or wireless electronic components that provide remote control of the exercise device—for example, on/off, activity tracking, resistance, pre-programmed activities/intervals, etc.

Figure 5:
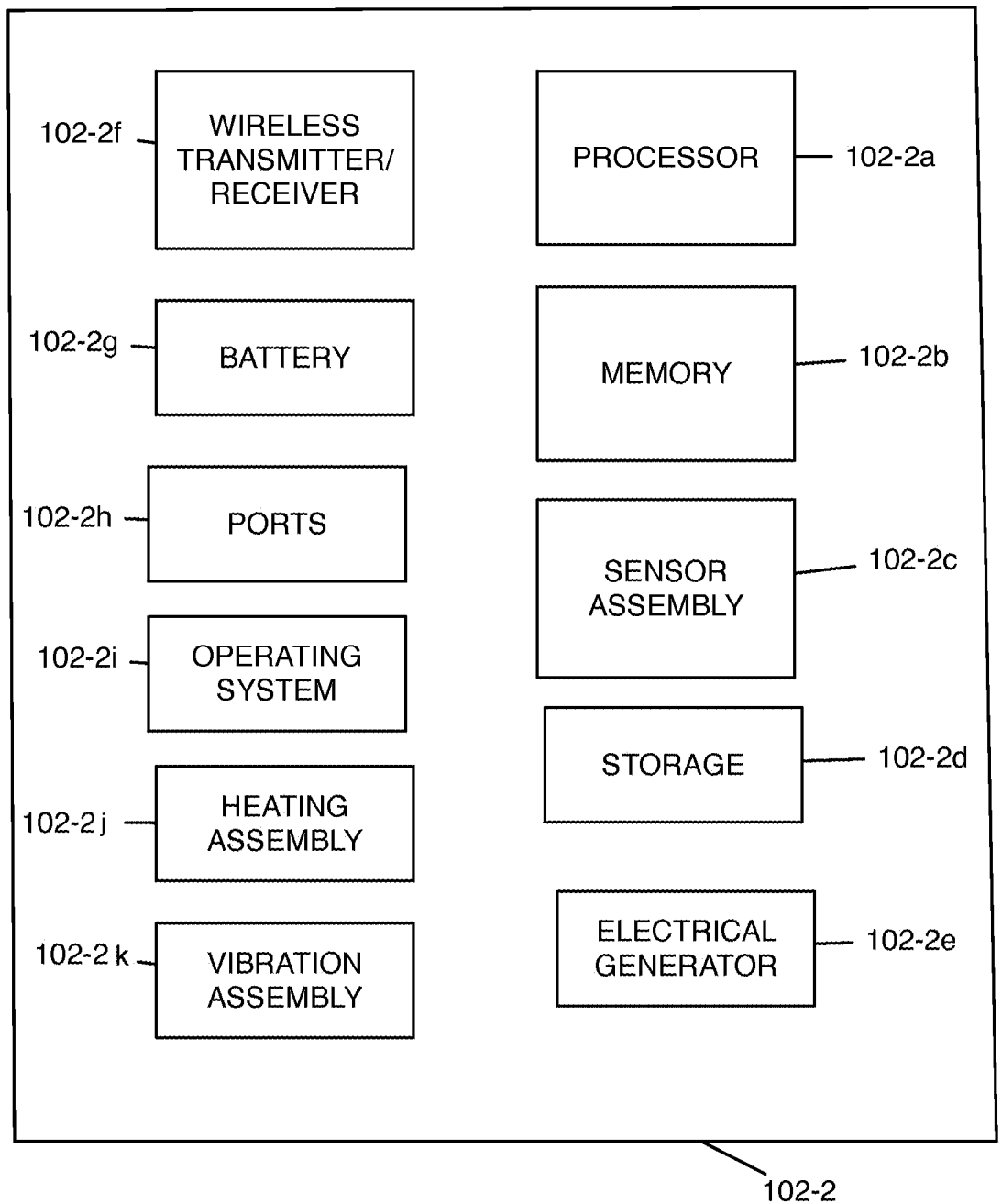
FIG. 5 depicts a block diagram of example electronic components in the exercise device shown in FIG. 2.

FIG. 5 depicts a block diagram of example electronic components 102-2 in the exercise device shown in FIG. 2. In one embodiment in particular, electronic components include processor 102-2a, memory 102-2b, sensor assembly 102-2c, storage device 102d, electrical generator 102-2e, wireless transmitter/receiver 102-2f, battery 102-2g, ports 102-2h and OS 102-2i.

Processor 102-2a processes for executing commands and for storing and retrieving data from memory 102-2b as well as storage device 102-2d.

Memory 102-2b is used for retaining and information on a short-term basis when memory 102-2b is powered.

Memory 102-2b may be RAM, but it may be any other volatile storage unit. The contents of memory 102-2b are accessible to processor 102-2a. The memory 102-2b may also include instructions for execution by processor 102-2a (it will run an operating system and possibly one or more application platforms including a part of a the user engagement platform for monitoring user exercise activity disclosed herein.)

Sensor assembly 102-2c incorporates one or more sensors that are used to sense rotational movement of the pulley 102-1b. In one embodiment, processor 102-2a calculates frequency based on the sensed signals and subsequently stores and transmits such frequency to a mobile device or personal computer. In another embodiment, the frequency may be calculated in the mobile device or personal computer.

Storage device 102-2d is used for storing data and applications including the operating system and a part of the user engagement platform for monitoring user exercise activity disclosed herein.

Electrical generator 102-2e generates current (i.e., power/energy) from the movement of the mechanical components (pedals, pulley etc.). A Dynamo is an example of such an electrical generator. The dynamo converts mechanical energy into electricity that is stored in battery 102-2g. A wire may connect battery 102-2g with a mobile device by way of a USB port on the elliptical trainer. The ability to charge a mobile device is an incentive for users to exercise. According to an embodiment of the invention, electrical generator 102-2e may be integrated with the resistive components 102-1e so that energy from added resistance may be utilized in charging battery 102-2g and/or a mobile device.

Wireless transmitter/receiver 102-2f (transceiver) is used to enable the elliptical trainer to communicate wirelessly with a mobile device, a personal computer, or a wireless gateway to a network. Wireless transmitter/receiver 102-2f enables two-way communication. As indicated above, the elliptical trainer may communicate wirelessly by means of Bluetooth or other wireless protocol. Data associated with user exercise activity may be transmitted to a mobile device. Alternatively, data and instructions may be transmitted from the mobile device to the elliptical trainer. For example, the mobile device may be configured to transmit electronic control instructions to the elliptical trainer to control the resistance of the pulley (and hence pedals) to increase the resistance for the user. Mobile device may transmit preprogrammed workouts to the elliptical trainer.

Battery 102-2g is an energy storage device for storing the current (i.e., power/energy) generated by mechanical components 102-1 (e.g., pedals and pulley). In accordance with an exemplary embodiment of the invention, control instructions with respect to the battery 102-2g may also be received by the transceiver 102-2f from a mobile device, computer, network, or the like.

One or more hardware ports 102-2h may be provided for interfacing with external devices. For example, one or more ports are used to enable wired connection between the elliptical trainer and a mobile device and/or a personal computer. A USB is an example of one such port.

The operating system (OS) may be a Windows based or a variant of another operating system, such as Apple OS, Linux, and the like.

Some or all of the electronic components 102-2 may be embedded on a PC board. Further, an Arduino with Bluetooth 4.0 controller board is an example of a PC board that performs the functions of many of the components including the sensor assembly and wireless transmitter/receiver 102-2f. The Arduino typically also includes a microcontroller. In this embodiment, the Arduino with Bluetooth enables the elliptical trainer to sense and transmit the number of rotations (signals) directly to other Bluetooth enabled devices such as a mobile device or personal computer. In this respect, a separate processor, memory storage and OS may not be needed.

Electronic components 102-2 may optionally include a heating assembly 102-2j and/or vibration assembly 102-2k. Heating assembly 102-2j may include the proper wiring and heating elements to heat the footpad/pedals 102-1a while a user exercises. Vibration assembly 102-2k may incorporate the proper wiring and electronics to cause the vibration (mechanical) components to vibrate in the footpad/pedals 102-1a of the elliptical trainer.

Figure 6:
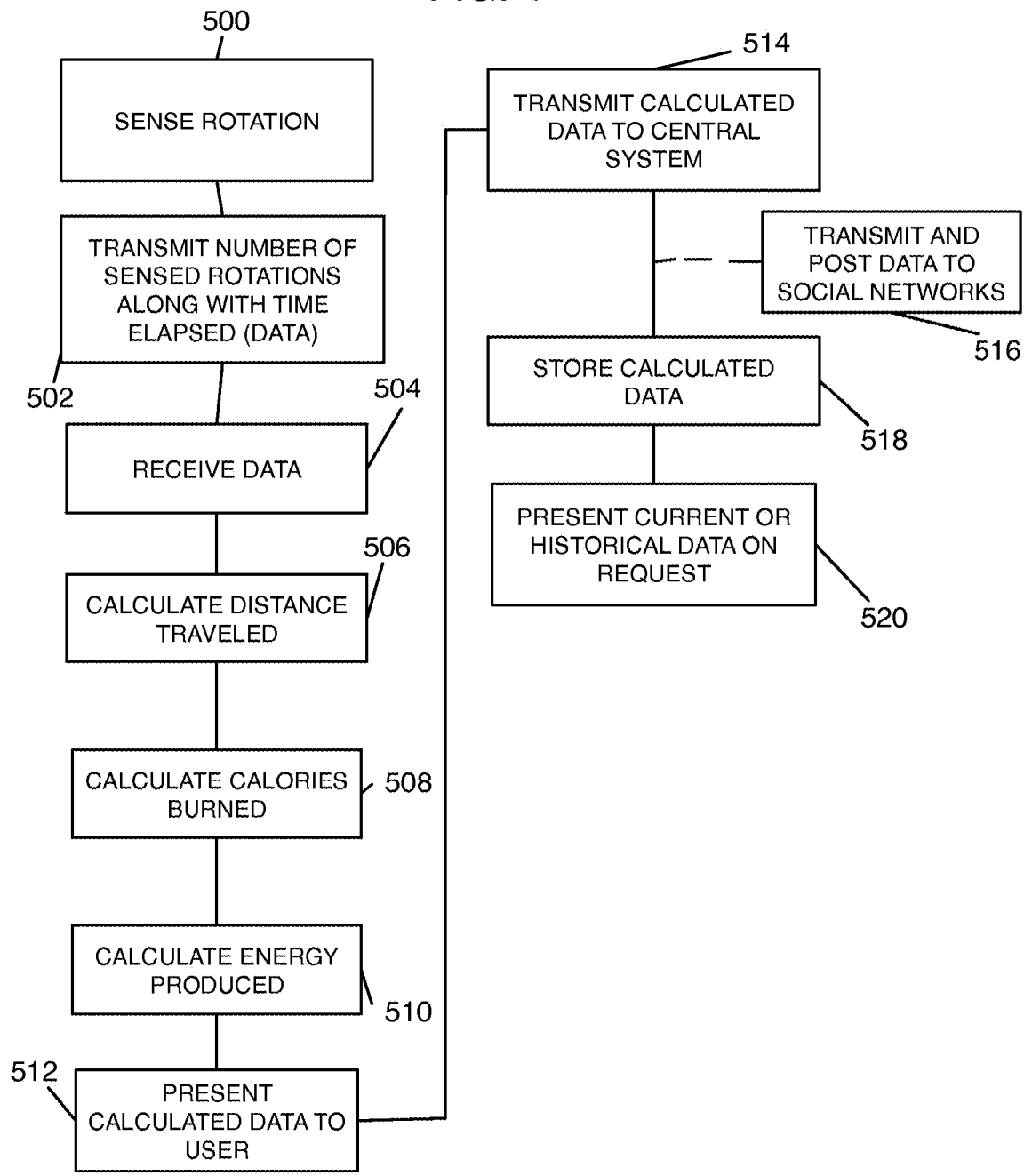
FIG. 6 is a flowchart of example high-level steps of an application process for a user engagement platform for monitoring user exercise activity.

FIG. 6 is a flowchart of example high-level steps of an application process for the providing a user engagement platform for monitoring user exercise activity. The platform is described and shown as steps applied across and through the exercise device 102 (for example), mobile device 108 (for example) and central system 118.

In particular, execution begins at steps 500 and 502 wherein pedal rotations are sensed (rotation is monitored) by sensing assembly 102-2c and then transmitted along with time elapsed by wireless transmitter/receiver 102-2h to a mobile device (or personal computer) by Bluetooth or other wireless protocols. In addition, resistance level of the pulley is also sensed and transmitted. As part of these steps, the sensed signals may be stored in memory 102-2b and processed locally by processor 102-2a or transmitted immediately (real time) or periodically, per interval (without processing) to a mobile device or personal computer. (Processing may involve calculating distance and other parameters as described below.) Regardless whether the data is stored and processed locally or remotely, the data is transmitted in real time to enable a user to monitor or track his/her exercise activity.

Execution then moves to step 504 wherein a mobile device 108 (for example) receives the rotation data. (In this embodiment, the data is raw data and it is stored.) A user may establish an account, wherein the user can access his/her exercise activity in accordance with this embodiment.

Execution then moves to steps 506, 508, 510 wherein exercise data parameters (also called exercise activity) are calculated such as distance, calories burned and amount of energy produced by the user. In addition, other exercise data parameters may be calculated and displayed including calories per unit distance and per rotation as well as energy generated per unit distance and per rotation. At step 512, the calculated parameters are presented (displayed) to the user, automatically or upon request through a standalone application or browser on a mobile device 108 or personal computer 112 and subsequently stored on the mobile device 108 or personal computer 112. Execution then moves to step (also called cloud) wherein the calculated data parameters are transmitted to central system 118 for storage, historical tracking and viewing.

Execution may move to step 516 wherein the calculated exercise activity is transmitted and posted, at the user's request, to a social networking website such as Facebook and/or transmitted to gaming consoles such as Nintendo Wii, Microsoft Xbox, Kinect or Oculus Rift. In this case, the user can share and compare stats within a community of authorized users. (Data from other known fitness tracking apps such as Fitbit, Jawbone, etc. may be captured here as well.)

The exercise activity posted via Facebook or gaming consoles provides greater motivation for a user to continue exercise activity.

Execution then moves to step 518 wherein the exercise activity is stored. Execution then moves to step 520 wherein single or multiple user exercise activity (current or historical) is presented for viewing by an administrator or other user at their request. In this respect, a user can track performance on individual accounts (or in aggregate as described below) and update and message all users directly.

A cloud database within central system 118 aggregates user data such as calories burned, distance traveled and elapsed time from multiple individual accounts to form larger pools of data categorized by population factors such as organization (e.g. corporate employer, student clubs, interest groups, universities), cities, countries, continents and other demographic indicators. A mobile interface displays rankings between different populations based on collective sums of data including calories burned, distance traveled and elapsed time. For example, Facebook employees could compare their own company-wide stats with Google, Amazon and Yahoo and use as a friendly competition if desired.

While the process steps are described in the order above, those skilled in the art know that the order may be changed or steps may be added or deleted to achieve the desired outcome as described.

Figure 7:
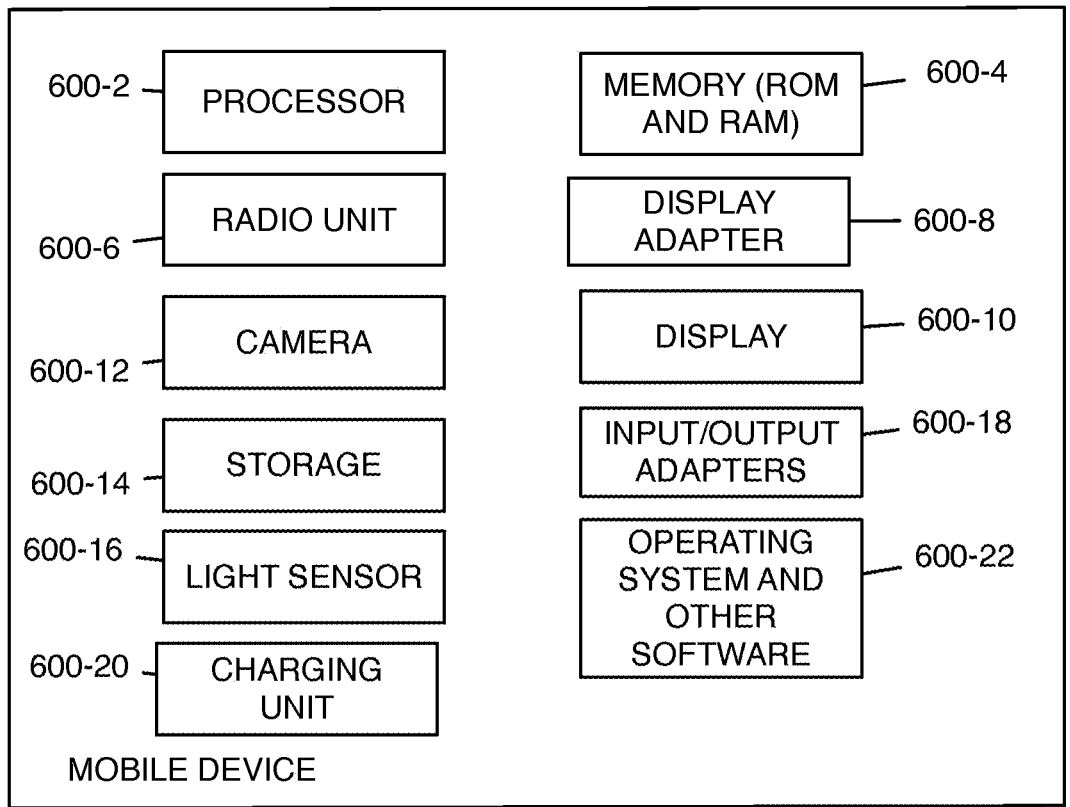
FIG. 7 depicts a block diagram of example components within a mobile device.

FIG. 7 depicts a block diagram of the components within mobile devices 600. Mobile device 600 is an example of mobile devices 108, 110 shown in FIG. 1. Mobile device 600 includes the same components as mobile devices 108, 110. Mobile device 600 preferably incorporates similar components as a personal computer (described below) including a processor, memory, storage and interface devices. In particular, mobile device 600 incorporates processor 600-2 configured to execute instructions and control other components of mobile device 600 in accordance with such instructions. Mobile device 600 further includes memory 600-4 for storing instructions including volatile and non-volatile memory such as random access memory and read only memory (RAM and ROM).

Mobile device 600 may communicate by wire or wireless means. Wireless communication is achieved by way of radio unit 600-6. Radio unit 600-6 is configured to communicate using radio frequency transmission. Radio unit 600-6 incorporates cellular, WIFI and Bluetooth transceivers for communication. Mobile device 600 may include a global positioning system (GPS) or such services may be performed using an application for GPS. Mobile device 600 also includes display adapter 600-8 and it is configured to control a display for conveying application process and various activity information, alerts, notifications and the like. Display adapter 600-8 communicates with a display 600-10 and camera 600-12. Mobile device 600 also includes storage 600-14 for storing data and programs, and light sensor 600-16 used to determine a level of brightness for the display for viewing. Mobile device 600 may optionally include input/output adapters 600-18. Mobile device 600 also includes a charging unit 600-20 for powering device 600. An accelerometer may optionally be incorporated for detecting movement of mobile device 600. Mobile device 600 may include other sensors. Mobile device 600 also includes an operating system 600-22 such as iOS, Android or Microsoft Windows Mobile along with other applications including Java etc.

Figure 8:
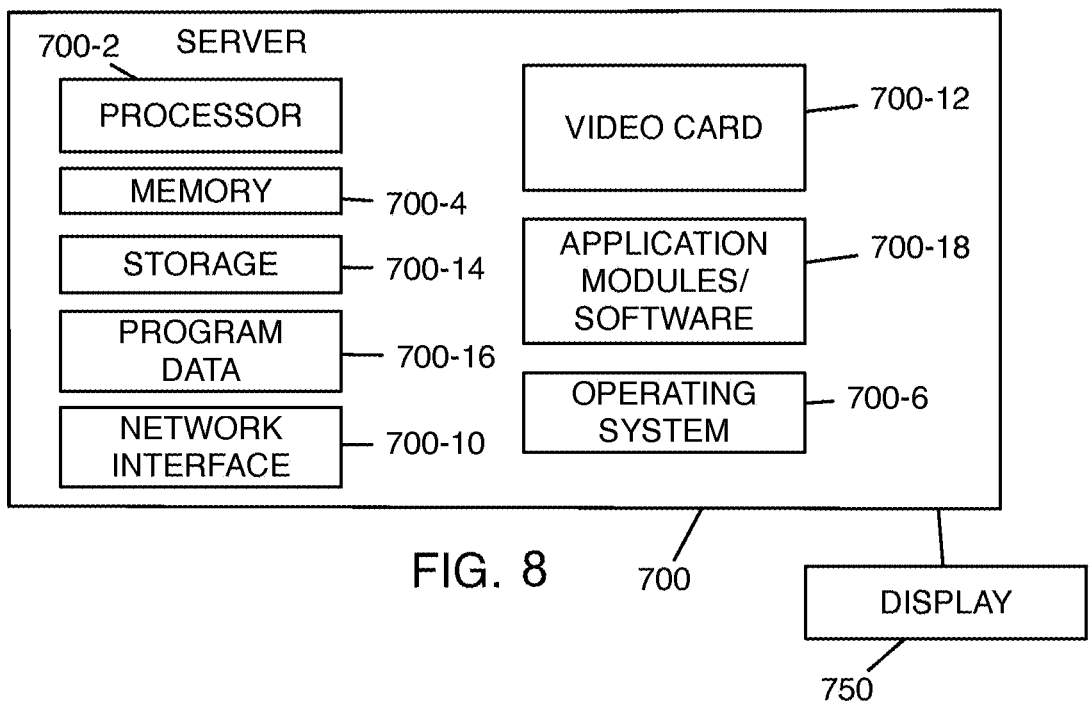
FIG. 8 depicts a general-purpose computer to support the embodiments of the computer-implemented systems and methods including computer components disclosed in this application.

FIG. 8 depicts a block diagram of a general-purpose computer to support the embodiments of the computer-implemented systems and methods disclosed herein. In a particular configuration, the computer 700 may be a computer server as described above with respect to central system 118 or personal computer. (Central system 118 is configured to enable part or all of the process steps of the application (software) in the embodiments described herein. The computer 700 typically includes at least one processor 700-2 and system memory 700-4 (volatile RAM or non-volatile ROM). System memory 700-4 is coupled to and its stored contents are accessible to the processor 700-2. In operation, the memory 700-4 may also include instructions from processor 700-2, an operating system 700-6 and one or more application platforms 700-8 such as Java and a part of a software component or one or more software components/applications 700-18. The computer may include one or more communication connections such as network interfaces 700-10 to enable the computer to communication with other computers over a network, storage 700-14 such as a hard drives for storing data 700-16 and other software described above, video cards 700-12 and other components. This computer 700 typically runs Unix or Microsoft as the operating system and include TCP/IP protocol stack for communication over the Internet. A display 750 is optionally used.

It is to be understood that the disclosure teaches examples of the illustrative embodiments and that many variations of the invention can easily be devised by those skilled in the art after reading this disclosure and that the scope of the present invention is to be determined by the claims below.

The invention claimed is:

1. A portable elliptical exercise apparatus, comprising:
a) a base plate;
b) a chassis connected to the base plate;
c) an anchor element extending upwards from the chassis;
d) a front bar connected to an end of the chassis for stabilizing the portable elliptical exercise apparatus during use;
e) a left pedal;
f) a left cross-shaped stabilizer having a first end and a second end,
wherein a first end of the left pedal is connected to the first end of the left cross-shaped stabilizer, and
wherein a second end of the left pedal is connected to a left wheel,
g) a right pedal;
h) a right cross-shaped stabilizer having a first end and a second end,
wherein the second end of the right cross-shaped stabilizer is opposite the first end of the left cross-shaped stabilizer,
wherein a first end of the right pedal is connected to the first end of the right cross-shaped stabilizer, and
wherein a second end of the right pedal is connected to a right wheel,
i) a pulley;
wherein the pulley, the left cross-shaped stabilizer, and the right cross-shaped stabilizer are coupled to the anchor element along a common rotation axis,
wherein concurrent rotation of the left cross-shaped stabilizer and rotation of the right-cross-shaped member causes
rotation of the pulley,
movement of the left and right pedals in an elliptical shape, and
movement of the first wheel and second wheel in opposing directions along the base plate;

j) a looped belt configured to couple the pulley to a resistance assembly,
  wherein the resistance assembly is coupled to the base plate; and
k) a tension stabilizer configured to maintain a tension of the looped belt on the pulley.

2. The portable elliptical exercise apparatus according to claim 1, wherein the resistance assembly is configured to assert a resistance to the left pedal and the right pedal through the looped belt,
  wherein the resistance is adjusted by changing a distance between a flywheel element and a corresponding magnetic plate element of the resistance assembly, the magnetic plate asserting a magnetic force over the distance on the flywheel element and the looped belt looping around a co-rotating extension from the flywheel element.

3. The portable elliptical exercise apparatus according to claim 2,
  wherein the common rotation axis is at a predetermined height such that the left pedal and right pedal range between approximately 2 degrees and 32 degrees from horizontal through the concurrent rotation of the left cross-shaped stabilizer and of the right-cross-shaped member.

4. The portable elliptical exercise apparatus according to claim 1, wherein a mass ratio between the left cross-shaped stabilizer and the pulley is approximately 2 to 1.

5. The portable elliptical exercise apparatus of claim 1, wherein a rotational diameter ratio between the pulley and the left cross-shaped stabilizer is approximately 4 to 3.

6. The portable elliptical exercise apparatus of claim 1, further comprising:
  a cover covering the pulley and the resistance assembly,
   wherein the cover comprises a handle located between the pulley and the resistance assembly.

* * * * *